United States Patent [19]
Siedel et al.

[11] Patent Number: 5,990,023
[45] Date of Patent: Nov. 23, 1999

[54] FIRE-RESISTANT GLAZING

[75] Inventors: Horst Siedel, Walchwil, Switzerland; Claude Morin, Puteaux; Pierre Jeanvoine, Poissy, both of France

[73] Assignee: Vetrotech Saint-Gobain International AG, Walchwil, Switzerland

[21] Appl. No.: 09/038,089

[22] Filed: Mar. 11, 1998

[51] Int. Cl.⁶ .................................................. C03C 3/087
[52] U.S. Cl. ............................................ 501/70; 501/72
[58] Field of Search ....................................... 501/70, 72

[56] References Cited

U.S. PATENT DOCUMENTS

| | | | |
|---|---|---|---|
| 3,984,252 | 10/1976 | Kiefer | 106/54 |
| 5,656,558 | 8/1997 | Brix et al. | 501/70 |
| 5,763,342 | 6/1998 | Mita et al. | 501/70 |
| 5,763,343 | 6/1998 | Brix et al. | 501/70 |
| 5,776,844 | 7/1998 | Koch et al. | 501/70 |

FOREIGN PATENT DOCUMENTS

| | | |
|---|---|---|
| 24 13 552 | 9/1975 | Germany. |
| 23 13 442 | 9/1976 | Germany. |
| 28 18 804 | 10/1980 | Germany. |
| 43 25 656 | 8/1996 | Germany. |

Primary Examiner—Karl Group
Attorney, Agent, or Firm—Pennie & Edmonds LLP

[57] ABSTRACT

Use is made, for the manufacture of fire-resistant glazings of the G fire-resistance classes, comprising panes made of glass toughened by the thermal route by means of a conventional toughening plant and possessing safety glass properties, of glasses which exhibit a thermal expansion coefficient $\alpha_{20-300}$ of between 6 and $8.5 \times 10^{-6}$ $K^{-1}$, a thermal stress factor $\phi$ of between 0.5 and 0.8N/(mm².K), a softening point of between 750 and 830° C. and a transformation point of at the very most 1190° C.

9 Claims, No Drawings

FIRE-RESISTANT GLAZING

BACKGROUND OF THE INVENTION

The present invention relates to a fire-resistant glazing of the G fire-resistance classes comprising a pane made of silicate glass, which pane is toughened by the thermal route with air by means of a conventional toughening plant, and possessing safety glass properties.

Fire-resistant glazings of the G fire-resistance classes and their frames and their mountings must withstand, during a fire-resistance test in accordance with DIN Standard 4102 or with ISO/DIS Standard 834-1, exposure to fire and to smoke for a certain period of time. During this time, the panes may neither shatter under the effect of the stresses which appear as a result of the temperature gradients between the surface of the pane and the embedded edge nor exceed their softening point, because they would otherwise lose their stability and would thus free the opening. According to the tire in minutes during which they withstand fire, they are ranked in the G 30, G 60, G 90 or G 120 fire-resistance classes.

In general, fire-resistant panes are held in frames which protect, to a more or less large extent, the edges of the panes against the effect of heat. The temperature gradient which thus appears between the middle of the pane and the edge brings about considerable tensile stresses in the marginal region and results in destruction of the panes, if specific measures are not taken to compensate for these tensile stresses. These measures consist of a thermal toughening of the panes making it possible to induce strong initial compressive stresses in the marginal region. The thermal toughening makes it possible to confer additional safety glass properties on the pane when the toughening is carried out, so that, in the event of shattering, the pane fragments into tiny pieces, It is in principle possible to measure the value of the initial stresses at the surface of the pane and in the marginal region by photoelasticimetry. This measurement by photoelasticimetry is, however, relatively expensive. In practice, success is consequently achieved in determining the state of initial stresses by means of the flexural/tensile strength obtained by the toughening, in accordance with DIN Standard 52303 or with EN Standard 12150. Experiments have, in this case, shown the necessity to provide a flexural/tensile strength of at least 120N/mm$^2$ when the pane has to withstand tensile stresses generated by temperature gradients at the edge. In view of the fact that non-toughened panes exhibit a base flexural/tensile strength of approximately 50N/mm$^2$, this means that it is necessary to increase this strength, via the toughening, by at least 70N/mm$^2$. The value of this increase in the flexural/tensile strength corresponds directly to the value of the initial surface compressive stresses.

In addition, it is possible to increase the fire-resistance time by increasing the depth of insertion of the pane into the frame. In the case of a flexural/tensile strength of the pane of 120N/mm$^2$ and of a depth of insertion of 10 mm, the glazing is, for example, in accordance with the G 30 fire-resistance class, whereas a depth of insertion of 20 mm makes it possible to achieve the G 90 fire-resistance class, Panes made of ordinary float glass (silica glass based on soda and lime) can be appropriately toughened by means of conventional toughening plants, in view of the fact that these glass compositions exhibit relatively high thermal expansion coefficients of greater than $8.5 \times 10^{-6}$ K$^{-1}$. Ordinary float glass makes it possible to achieve flexural/tensile strengths which can range up to 200N/mm$^2$. Under the effect of the tensile stresses brought about by the temperature gradients, the panes do not consequently shatter if the depth of insertion is approximately 10 mm but they lose their stability because of their relatively low softening temperature of approximately 730° C. Toughened panes made of float glass are thus in accordance, under normal installation conditions, with at the very most the G 30 fire-resistance class.

However, monolithic panes of the G 60 fire-resistance class and of higher classes are also known. These panes are composed of compositions having a high softening temperature of greater than 815° C. and exhibit, for this reason, a lengthy resistance time during a fire-resistance test. In this case, heat-resistant glasses based on borosilicate and on aluminosilicate prove to be particularly appropriate. However, these panes also have to be toughened by the thermal route in order to be able to withstand the high tensile stresses which appear in the marginal region during a fire-resistance test.

The use of thermal toughening for fire-barrier glazings made of heat-resistant glasses based on borosilicate or on aluminosilicate is known from the documents DE 23 13 442 B2 and DE 24 13 552 B2. According to these documents, only glasses for which the product of the thermal expansion a and of the modulus of elasticity E reaches 1 to 5 kp.cm$^{-2}$.° C.$^{-1}$, that is to say glasses based on borosilicate or on aluminosilicate with a thermal expansion of $\alpha_{20-300}$=3 to $6.5 \times 10^{-6}$° C.$^1$, are suitable for toughening. However, the toughening required at the edge of these panes cannot be achieved by means of ordinary air toughening plants but involves a specific process in which the panes are placed, during heating, between slightly smaller ceramic tiles, so that the edge of the pane sticks out from the ceramic tiles and is thus cooled more quickly, whereas the middle of the pane cools more slowly under the effect of the ceramic tiles. The toughening required at the edge can certainly be obtained in this way but the panes thus manufactured do not exhibit any safety glass properties.

It is known, from the document DE 43 25 656 C2, to use, for the manufacture of monolithic fire-barrier glazings, glasses which have a thermal expansion coefficient a of between 3 and $6 \times 10^{-6}$ K$^{-1}$, a specific thermal stress $\phi$ of between 0.3 and 0.5N/(mm$^2$.K), a softening point (=temperature for a viscosity of $10^{7.6}$ dPa·s) of greater than 830° C. and a transformation point (=temperature for a viscosity of $10^4$ dPa·s) of between 1190° and 1260° C. The specific thermal stress is the quantity specific to the glass calculated from the thermal expansion coefficient $\alpha$, from the modulus of elasticity E and from the Poisson coefficient m according to the formula $\phi=\alpha.E/(1-m)$. Panes exhibiting these physical properties can acquire, in a conventional air toughening plant, both the initial compressive stresses necessary at the edge and the toughening stresses exerted over the entire surface, which are necessary in order to obtain fragmentation in tiny pieces, so that no specific measure is necessary for the toughening and that the manufacturing process is thus greatly simplified thereby. Panes exhibiting these physical properties necessarily contain, however, $B_2O_3$, $Al_2O_3$ and $ZrO_2$ in amounts which complicate the melting process and the transformation process. They cannot be manufactured according to the float-glass process, which has proved its exceptional profitability, given that their transformation point is too high and that the melting additionally requires specific measures.

Borosilicate-based glass compositions are known, from the document DE 28 18 804 B2, which are certainly designed for use in fire-barrier glazings and which, because of their relatively low transformation point, can melt according to the float-glass process and can also be toughened by means of ordinary toughening plants. These glasses contain, however, 11.5 to 14.5% $B_2O_3$ and in addition exhibit physical properties similar to those of the glasses known from the document DE 43 25 656 C2. Even in the case of these glasses, the initial compressive stresses and the flexural/tensile strength which can be achieved with air toughening are limited to relatively low values and these glasses moreover exhibit the difficulties and disadvantages known during the melting of borosilicate-based glasses.

SUMMARY OF THE INVENTION

The aim of the invention is to provide monolithic fire-barrier glazings of the G fire-resistance class which, on the one hand, can be toughened by means of conventional air toughening plants and which, on the other hand, have glass compositions which melt without posing economic and technological problems and which can be transformed into flat glass according to the ordinary float-glass process, it being possible for this glass to be comparable as regards its appearance and its optical properties with known float glass.

DETAILED DESCRIPTION OF THE INVENTION

This aim is achieved, in accordance with the invention, by the use of glasses exhibiting a thermal expansion coefficient $\alpha_{20-300}$ of 6 to $8.5 \times 10^{-6}$ $K^{-1}$, a thermal stress factor $\phi$ of 0.5 to 0.8N(mm².K), a softening point (viscosity=$10^{7.6}$ dPa·s) of 750° to 830° C. and a transformation point (viscosity=$10^4$ dPa·s) of at the very most 1190° C.

Glass compositions which exhibit these physical properties can be chosen from known glass compositions, while taking care that these glass compositions do not comprise $B_2O_3$ and $Al_2O_3$ or at least as little as possible.

It has been found that glasses exhibiting the properties in accordance with the invention not only can melt relatively well but in addition are particularly suitable for the manufacture of monolithic fire-barrier glazings, insofar as, even in the case of conventional air toughening, they exhibit a flexural/tensile strength markedly better than that of glasses based on borosilicate and on aluminosilicate known in the manufacture of fire-barrier glazings. By virtue of their higher thermal expansion coefficient and of their higher thermal stress factor, it is possible, in fact, to obtain, by means of ordinary toughening plants, markedly greater flexural/tensile strengths, that is to say markedly higher initial compressive stresses, so as to substantially increase the resistance to the temperature difference which can be achieved between the embedded cold edge and the middle of the hot pane. In addition, it transpired that the resistance of these glasses was entirely sufficient to satisfy the G 30 fire-resistance class, even in the case of a depth of insertion into the frame of 10 mm. The glasses used in accordance with the invention also make it possible, however, to achieve the higher G 60, G 90 or indeed even G 120 fire-resistance classes when, if appropriate, use is made of panes with a greater thickness and of a frame in which they are more deeply embedded, that is to say a frame which covers the edge of the pane to a greater extent, for example up to 25 mm.

Other advantages and aspects of implementation in accordance with the invention, as well as other consequences of the invention, will emerge from the dependent claims and from the following description of various implementational examples.

EXAMPLE 1

Use is made, in the manufacture of the fire-barrier glazing, of a flat pane with a thickness of 5 mm manufactured according to the float-glass process and exhibiting the following composition as % by weight. 75.4% $SiO_2$, 11.0% $Na_2O$, 12.0% CaO, 1.0% $Al_2O_3$, 0.3% $K_2O$ and 0.3% other oxides.

This glass exhibits the following physical properties:

| | |
|---|---|
| thermal expansion coefficient $\alpha_{20-300}$ = | $7.6 \times 10^{-6}$ $K^{-1}$ |
| thermal stress factor $\phi$ = | 0.69 N/(mm².K) |
| modulus of elasticity E = | $7.14 \times 10^4$ N/mm² |
| Poisson coefficient $\mu$ = | 0.215 |
| softening point Ts = | 761° C. |
| transformation point Tw = | 1061° C. |

Several 90×55 cm² panes are subjected to softening at the edges and toughened in the horizontal position in an ordinary air toughening plant. To this end, they are heated to a temperature of approximately 670° C. and suddenly cooled by means of two ordinary blowing chambers. The blowing chambers are provided with blowing nozzles arranged in rows, the distance separating the rows of blowing nozzles from one another being approximately 8 cm, the reciprocal distance between two nozzles in the rows of blowing nozzles being 3 cm and the diameter of the orifice of the nozzles being 8 mm. The distance between the orifices of the nozzles and the glass surface is approximately 5 cm and the static pressure of the air in the blowing chambers is 7.5 kPa±10%.

Measurements of the flexural/tensile strength of the toughened panes according to the process described in EN Standard 12150 have shown flexural/tensile strengths of the panes of the order of 210±10N/mm². This value corresponds to an initial surface compressive stress of approximately 160N/mm².

Fire-resistance tests in accordance with ISO/DIS Standard 834-1 are carried out with three panes of the same type embedded in the frame to a depth of 10 mm. During two fire-resistance tests, the panes resist fire for 65 minutes and, during the third fire-resistance test, the panes resist for 71 minutes. This fire-barrier glazing thus meets the conditions of the G 60 fire-resistance class.

EXAMPLE 2

Panes with a thickness of 6 mm, exhibiting the same composition as that of the panes of Example 1, are used, these panes also having been manufactured according to the float-glass process. The glass consequently exhibits the same physical properties as that of Example 1. In the present case, several 70×150 cm² panes are subjected to softening at their edges and they are toughened by the thermal route under the same conditions as those in Example 1.

Measurements of the flexural/tensile strength of these toughened panes give values of 250±15N/mm². Fire-resistance tests are carried out on three of these panes with a thickness of 6 mm embedded, during these experiments, in the metal frame over a depth of 15 mm. During the three fire-resistance tests, the resistance time reaches more than 90 minutes, so that these fire-barrier glazings with a thickness of 6 mm and a depth of embedding in the frame of 15 mm satisfy the G 90 fire-resistance class.

EXAMPLE 3

Use is made, for the manufacture of the fire-barrier glazing, of a glass with the following composition: 67.0% $SiO_2$, 10.0% CaO, 2.0% MgO, 2.5% SrO, 7.0% $Na_2O$, 5.0% $K_2O$, 1.0% $Al_2O_3$ and 5.5% $ZrO_2$.

This glass exhibits the following physical properties:

| | |
|---|---|
| thermal expansion coefficient $\alpha_{20-300}$ = | $7.9 \times 10^{-6}$ K$^{-1}$ |
| thermal stress factor $\phi$ = | 0.76 N/(mm$^2$.K) |
| modulus of elasticity E = | $7.7 \times 10^4$ N/mm$^2$ |
| Poisson coefficient $\mu$ = | 0.21 |
| softening point Ts = | 800° C. |
| transformation point Tw = | 1190° C. |

A glass strip with a thickness of 8 mm is manufactured from the molten glass according to the float-glass process. Several panes with dimensions of 150×70 cm$^2$ are subjected to shaping at their edges and toughened, as described in Example 1, in ordinary air toughening plants.

Measurements of the flexural/tensile strength of the toughened panes give values of 235±10 N/mm$^2$.

Fire-resistance tests in accordance with the cited standard are carried out with three toughened panes of the same type with a thickness of 8 mm and, in this case, embedded in the metal frame over a depth of 22 mm. During the three fire-resistance tests, the resistance time reaches more than 120 minutes, so that this fire-barrier glazing satisfies the conditions of the G 120 fire-resistance class.

We claim:

1. Fire-resistant glazing of the G fire-resistance classes comprising a pane made of silicate glass toughened by a thermal route with air by means of a toughening procedure and possessing safety glass properties, comprising 65–76% by weight of SiO$_2$, 6–12% by weight of Na$_2$O, 9–13% by weight of CaO, less than 1.5% by weight of Al$_2$O$_3$, 0.1–6% by weight of K$_2$O, less than 3% by weight of MgO, less than 4% by weight of SrO, and less than 6% by weight of ZrO$_2$, characterized in that the glass is essentially free of boric oxide and exhibits a thermal expansion coefficient $\alpha_{20-300}$ of 6 to 8.5×10$^{-6}$ K$^{-1}$, a thermal stress factor $\phi$ of 0.5 to 0.8N/(mm$^2$.K), a softening point, for a viscosity of 10$^{7.6}$ dPa·s, of 750° to 830° C. and a transformation point, for a viscosity of 10$^4$ dPa·s, of no greater than 1190° C.

2. Fire-resistant glazing according to claim 1, wherein the glass exhibits a thermal expansion coefficient $\alpha_{20-300}$ of 6.5 to 7.5×10$^{-6}$ K$^{-1}$, a thermal stress factor $\phi$ of 0.6 to 0.7N/(mm$^2$.K) and a softening of 800° to 820° C.

3. Fire-resistant glazing comprising a glass pane having a composition of the following components in % by weight:

| | |
|---|---|
| SiO$_2$ | 73–76 |
| CaO | 11–13 |
| Na$_2$O | 10–12 |
| K$_2$O | 0.1–0.5 |
| Al$_2$O$_3$ | 0.5–1.5. |

4. Fire-resistant glazing comprising a glass pane having a composition of the following components in % by weight:

| | |
|---|---|
| SiO$_2$ | 65–69 |
| CaO | 9–11 |
| MgO | 1–3 |
| SrO | 2–4 |
| Na$_2$O | 6–8 |
| K$_2$O | 4–6 |
| Al$_2$O$_3$ | 0.5–1.5 |
| ZrO$_2$ | 4–6. |

5. Fire-resistant glazing according to any one of claims 1 to 4, characterized in that the pane exhibits initial surface compressive stresses of 120 to 200N/mm$^2$.

6. Fire-resistant glazing according to any one of claims 1 to 4, characterized in that the pane exhibits initial surface compressive stresses of 150 to 190N/mm$^2$.

7. Fire-resistant glazing comprising a pane having a composition consisting essentially of 65–76% by weight of SiO$_2$, 6–12% by weight of Na$_2$O, 9–13% by weight of CaO, less than 1.5% by weight of Al$_2$O$_3$, 0.1–6% by weight of K$_2$O, less than 3% by weight of MgO, less than 4% by weight of SrO, and less than 6% by weight of ZrO$_2$, and having a thermal expansion coefficient $\alpha_{20-300}$ of 6 to 8.5×10$^{-6}$ K$^{-1}$, a thermal stress factor $\phi$ of 0.5 to 0.8N/(mm$^2$.K), a softening point, for a viscosity of 10$^{7.6}$ dPa·s, of 750° to 830° C. and a transformation point, for a viscosity of 10$^4$ dPa·s, of no greater than 1190° C.

8. Fire-resistant glazing according to claim 7, characterized in that the pane exhibits initial surface compressive stresses of 120 to 200N/mm$^2$.

9. Fire-resistant glazing according to claim 7, characterized in that the pane exhibits initial surface compressive stresses of 150 to 190N/mm$^2$.

* * * * *

UNITED STATES PATENT AND TRADEMARK OFFICE
CERTIFICATE OF CORRECTION

PATENT NO. : 5,990,023
DATED : November 23, 1999
INVENTOR(S) : Horst Siedel et al.

It is certified that error appears in the above-identified patent and that said Letters Patent is hereby corrected as shown below:

<u>Title page,</u>
Insert Item:
-- [30]   Foreign Application Priority Data
March 13, 1997   [DE]   Germany...................197 10 289.1 --

Signed and Sealed this

Fifteenth Day of February, 2005

JON W. DUDAS
*Director of the United States Patent and Trademark Office*